US011109099B1

(12) United States Patent
Doggett et al.

(10) Patent No.: US 11,109,099 B1
(45) Date of Patent: Aug. 31, 2021

(54) TECHNIQUES FOR STREAMING A MEDIA TITLE BASED ON USER INTERACTIONS WITH AN INTERNET OF THINGS DEVICE

(71) Applicant: DISNEY ENTERPRISES, INC., Burbank, CA (US)

(72) Inventors: Erika Varis Doggett, Los Angeles, CA (US); Michael Goslin, Sherman Oaks, CA (US); Douglas A. Fidaleo, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/005,271

(22) Filed: Aug. 27, 2020

(51) Int. Cl.
*H04H 60/33* (2008.01)
*H04N 21/442* (2011.01)
*H04N 21/466* (2011.01)
*H04N 21/458* (2011.01)

(52) U.S. Cl.
CPC ..... *H04N 21/44218* (2013.01); *H04N 21/458* (2013.01); *H04N 21/4665* (2013.01)

(58) Field of Classification Search
None
See application file for complete search history.

(56) References Cited

U.S. PATENT DOCUMENTS

| | | | | | |
|---|---|---|---|---|---|
| 4,569,026 | A | * | 2/1986 | Best | A63F 13/00 715/716 |
| 5,861,881 | A | * | 1/1999 | Freeman | H04N 21/2365 715/201 |
| 10,419,790 | B2 | * | 9/2019 | Gersten | H04N 21/454 |
| 2002/0108109 | A1 | * | 8/2002 | Harris | H04N 21/8541 725/32 |
| 2002/0120925 | A1 | * | 8/2002 | Logan | A61K 36/48 725/9 |
| 2002/0166123 | A1 | * | 11/2002 | Schrader | H04N 21/8543 725/58 |
| 2003/0093790 | A1 | * | 5/2003 | Logan | G11B 27/34 725/38 |

(Continued)

OTHER PUBLICATIONS

Ali, et al.; Golden Path Analyzer: Using Divide-and-Conquer to Cluster Web Clickstreams; date unknown; 10 pages.

(Continued)

*Primary Examiner* — William J Kim
(74) *Attorney, Agent, or Firm* — Artegis Law Group, LLP

(57) ABSTRACT

In various embodiments, an interactive streaming application plays back a media title via a client device. In operation, the interactive streaming application causes the client device to playback a first chunk of the media title. While the client device plays back the first chunk, the interactive streaming application determines a movement of an internet of things ("IoT") device that is controlled by the user. The interactive streaming application performs reinforcement-learning operation(s) based on the first chunk and the movement to determine a second chunk of the media title to playback. The interactive streaming application then causes the client device to playback the second chunk of the media title. Advantageously, the interactive streaming application can automatically personalize the playback of the media title for the user based, at least in part, on movements of the IoT device.

20 Claims, 4 Drawing Sheets

(56) References Cited

U.S. PATENT DOCUMENTS

| | | | |
|---|---|---|---|
| 2006/0064733 A1* | 3/2006 | Norton | H04N 21/8545 725/135 |
| 2006/0251407 A1* | 11/2006 | Thordarson | G08C 17/02 386/230 |
| 2009/0083631 A1* | 3/2009 | Sidi | H04N 21/254 715/721 |
| 2009/0116702 A1* | 5/2009 | Conradt | H04N 21/435 382/118 |
| 2010/0079585 A1* | 4/2010 | Nemeth | H04N 13/363 348/54 |
| 2011/0009175 A1* | 1/2011 | Raichman | H04N 21/435 463/1 |
| 2011/0107215 A1* | 5/2011 | Klappert | H04N 21/42203 715/716 |
| 2011/0307924 A1* | 12/2011 | Roberts | H04N 21/2668 725/44 |
| 2012/0227063 A1* | 9/2012 | Tsurumi | H04N 21/6582 725/10 |
| 2012/0323521 A1* | 12/2012 | De Foras | G06F 3/0346 702/141 |
| 2013/0094830 A1* | 4/2013 | Stone | H04N 5/775 386/230 |
| 2013/0145385 A1* | 6/2013 | Aghajanyan | H04N 21/251 725/10 |
| 2013/0205314 A1* | 8/2013 | Ramaswamy | H04N 21/44218 725/14 |
| 2014/0019865 A1* | 1/2014 | Shah | H04N 21/8545 715/731 |
| 2014/0325557 A1* | 10/2014 | Evans | H04N 21/4307 725/34 |
| 2015/0074698 A1* | 3/2015 | Pinto | H04N 21/6582 725/14 |
| 2015/0229975 A1* | 8/2015 | Shaw | H04H 60/33 725/10 |
| 2016/0151705 A1* | 6/2016 | Ji | H04N 21/4223 463/29 |
| 2017/0134828 A1* | 5/2017 | Krishnamurthy | H04N 21/439 |
| 2017/0200544 A1* | 7/2017 | Bassett | H01F 7/206 |
| 2017/0264920 A1* | 9/2017 | Mickelsen | H04N 21/44008 |
| 2018/0117465 A1* | 5/2018 | Voris | A63F 13/26 |
| 2018/0124438 A1* | 5/2018 | Barnett | H04N 21/4826 |
| 2019/0166412 A1* | 5/2019 | Panchaksharaiah | H04N 21/26258 |
| 2019/0373330 A1* | 12/2019 | Bloch | H04N 21/25891 |

OTHER PUBLICATIONS

Ji, et al.; 3D Convolutional Neural Networks for Human Action Recognition; dated 2010; 8 pages.

Wang, et al.; Action Recognition with Improved Trajectories; dated 2013; 8 pages.

Simonyan, et al.; Two-Stream Convolutional Networks for Action Recognition in Videos; dated Nov. 12, 2014; 11 pages.

Donahue, et al.; Long-term Recurrent Convolutional Networks for Visual Recognition and Description; dated May 31, 2016; 14 pages.

Rohit Ghosh; Qure.ai Blog; Revolutionizing healthcare with deep learning; Deep Learning for Videos: A 2018 Guide to Action Recognition; dated Jun. 11, 2018; 25 pages.

* cited by examiner

TECHNIQUES FOR STREAMING A MEDIA TITLE BASED ON USER INTERACTIONS WITH AN INTERNET OF THINGS DEVICE

BACKGROUND

Field of the Various Embodiments

The various embodiments relate generally to computer science and communications technology and, more specifically, to techniques for streaming a media title based on user interactions with an internet of things device.

Description of the Related Art

A media streaming service typically provides access to a library of media titles that can be viewed on a range of different client devices. In many implementations, to playback a requested media title via a given client device, the media streaming service sequentially transmits discrete portions or "chunks" of the requested media title over a connection to the client device in accordance with the storyline or "narrative" associated with the media title. To reduce the likelihood of a temporary degradation in the connection causing a playback interruption, a playback application executing on the client device usually stores or "buffers" multiple chunks of the requested media title before initiating the playback of the requested media title in order to prevent occurrences of buffer underrun.

Most media titles have predetermined narratives that are specified as a linear ordering of the chunks in the media title from a beginning chunk to an end chunk. In general, the narrative of a given media title is designed to appeal to the majority of likely users (i.e., viewers of the media title). For example, an action movie could have a relatively short introduction or "exposition" and a relatively long climax, while a drama movie could have a relatively long exposition and a relatively short climax. One problem associated with providing a predetermined narrative for a media title is that some users may have individual preferences for which the narrative is not designed. For example, a given user could become bored during the playback of the exposition portion of a media title that the vast majority of users find engrossing.

Because of mismatches between narratives and individual preferences, users oftentimes resort to manually overriding the playback of various portions of given media titles. For example, a user could use a fast-forward button to skip over a particular portion of the media title. In response to fast-forward and other types of navigation commands, a streaming media provider usually determines a "resumption" chunk from which to resume playback of the media title being viewed by the user. Beginning with the resumption chunk, the streaming media provider resumes sequentially transmitting chunks of the requested media title to the client device in accordance with the media title narrative. After receiving the resumption chunk and enough subsequent chunks to re-build the reserve of stored or "buffered' chunks, playback of the media title is resumed.

One drawback of manually overriding the playback of a media title is that the associated playback delays can substantially degrade the overall quality of the viewing experience. Referring back to the above example, if a user were to fast forward and skip a portion of a media title, then there could be a resulting playback delay of up to ten seconds, while the playback application rebuilds or "re-buffers" the reserve of stored chunks, beginning with the resumption chunk. Another drawback associated with manually overriding a playback of a media title is that a user can inadvertently skip a plot twist or other essential aspect of the narrative, which can reduce the overall quality of the media title in the mind of the user.

As a general matter, personalizing viewing experiences is desirable because doing so is a way to potentially increase overall viewership of media titles. However, allowing users to change the order of the chunks of the media titles being viewed involves largely manual processes, which, as noted above, can cause essential aspects of narratives to be inadvertently skipped, thereby reducing overall viewing experience quality.

As the foregoing illustrates, what is needed in the art are more effective techniques for playing back media titles to users.

SUMMARY

One embodiment of the present invention sets forth a computer-implemented method for playing back a media title. The method includes causing a client device to playback a first chunk of the media title; while the client device plays back the first chunk, determining a first movement of an internet of things ("IoT") device under control of a user; performing one or more reinforcement-learning operations based on the first chunk and the first movement to determine a second chunk of the media title to playback; and causing the client device to playback the second chunk of the media title.

At least one technical advantage of the disclosed techniques relative to the prior art is that, with the disclosed techniques, the playback of a given media title can be personalized automatically for different users to reflect individual preferences of those users. In particular, the disclosed techniques enable the use of narrative instructions to personalize the playback of a media title without interrupting playback. Further, the playback of the media title can be personalized any number of times during playback. Consequently, the overall quality of the viewing experience for a given media title can be increased across a broad range of users. Further, because playback is personalized based on a playback goal that correlates to user interest, the disclosed techniques also can increase the perceived quality of a media title in the minds of users. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
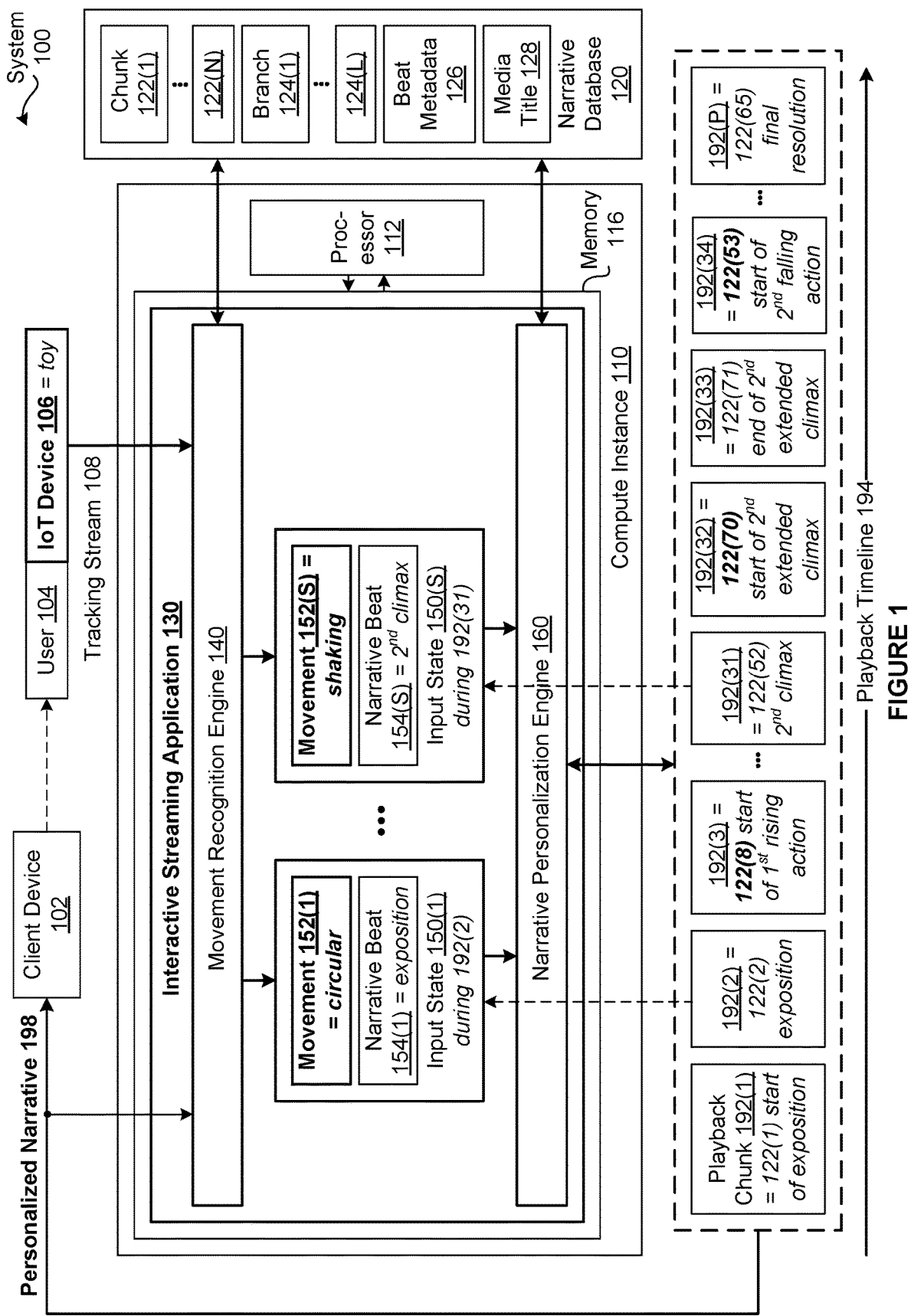
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, a compute instance 110, a client device 102, an internet of things ("IoT") device 106, and a narrative database 120. For explanatory purposes, multiple instances of like objects are denoted with reference numbers identifying the object and parenthetical alphanumeric character(s) identifying the instance where needed. Also, for explanatory purposes, multiple snapshots of a single object, where each snapshot is associated with a different point in time, are denoted with reference numbers identifying the object and a parenthetical number identifying the point in time where needed.

Any number of the components of the system 100 can be distributed across multiple geographic locations or implemented in one or more cloud computing environments (i.e., encapsulated shared resources, software, data, etc.) in any combination. In some alternate embodiments, the system 100 can include any number of compute instances 110, any number of client devices 102, any number of IoT devices 106, any number of narrative databases 120, or any combination thereof. In the same or other alternate embodiments, each of the compute instances 110 can be implemented in a cloud computing environment, implemented as part of any other distributed computing environment, or implemented in a stand-alone fashion.

As shown, the compute instance 110 includes, without limitation, a processor 112 and a memory 116. The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. In some alternate embodiments, each of any number of compute instances 110 may include any number of processors 112 and any number of memories 116 in any combination. In particular, any number of the compute instances 110 (including one) can provide a multiprocessing environment in any technically feasible fashion.

The memory 116 can be one or more of a readily available memory, such as random-access memory, read only memory, floppy disk, hard disk, or any other form of digital storage, local or remote. In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In general, the compute instance 110 is configured to implement one or more applications or subsystems of applications. For explanatory purposes only, each application is described as residing in the memory 116 of the compute instance 110 and executing on a processor 112 of the compute instance 110. However, in some alternate embodiments, the functionality of each application can be distributed across any number of other applications that reside in the memories 116 of any number of compute instances 110 and execute on the processors 112 of any number of compute instances 110 in any combination. Further, the functionality of any number of applications or subsystems can be consolidated into a single application or subsystem.

In particular, the compute instance 110 is configured to stream a media title 128 to the client device 102. The media title 128 can be any associated with any amount and/or types of media content in any technically feasible fashion. For instance, in some embodiments, the media title 128 can be a feature-length movie, a short film, an episode of a show, an audiovisual clip, a recording of a sports or music event, and so forth. In some alternate embodiments, the compute instance 110 streams the media title 128 and/or any number of other media titles 128 to any number of client devices 102 in any combination.

The media title 128 is associated with chunks 122(1)-122(N), where N can be any integer. The chunks 122(1)-122(N) are also referred to herein individually as "the chunk 122" and collectively as "the chunks 122." Each of the chunks 122 is a discrete portion of media content that can include, without limitation, any amount (including none) of visual content and any amount (including none) of audio content in any combination. In some embodiments, the media content included in each of the chunks 122 is organized as a sequence of frames of media content, and the total number of frames in each of the chunks 122 may vary. In some embodiments, each of the chunks 122 is a different shot that includes, without limitation, any number of frames captured continuously from a given camera or other capture point.

The client device 102 can be any device that is capable of receiving and displaying the chunks 122. For example, the client device 102 can be a desktop computer, a laptop computer, a tablet, a smartphone, a game console, a television, etc. The client device 102 can receive and display the chunks 122 in any technically feasible fashion. In some embodiments, the compute instance 110 sequentially transmits the chunks 122 over a connection to the client device 102.

As shown, a user 104 views the media title 128 via the client device 102. As used herein, "viewing" the media title 128 refers to viewing a playback of the media title 128. Further, "a playback" of the media title 128 refers to a display of any number of the frames included in any number of the chunks 122 associated with the media title 128. In some alternate embodiments, any number of users 104 can view the media title 128 via the client device 102. In the same or other alternate embodiments, any number of users 104 can view any number of media titles 128 via any number of client devices 102.

In some embodiments, the client device 102 includes, without limitation, a playback application (not shown). The playback application resides and executes on the client device 102 and can display media content the chunks 122) using any type of display accessible to the client device 102.

To reduce the likelihood of a temporary degradation in the connection to the compute instance 110 causing a playback interruption, the playback application usually stores or "buffers" multiple chunks 122 of the media title 128 before initiating the playback of the media title 128 in order to prevent occurrences of buffer underrun.

As described previously herein, most media titles have predetermined narratives that are specified as a linear ordering of the chunks in the media title from a beginning chunk to an end chunk. One problem associated with providing a predetermined narrative for a media title is that some users may have individual preferences for which the narrative is not designed. Because of mismatches between narratives and individual preferences, users oftentimes resort to manually overriding the playback of various portions of given media titles. One drawback of manually overriding the playback of a media title is that the associated playback delays can substantially degrade the overall quality of the viewing experience. Another drawback associated with manually overriding a playback of a media title is that a user can inadvertently skip a plot twist or other essential aspect of the narrative, which can reduce the overall quality of the media title in the mind of the user.

Dynamically Personalizing a Playback of a Media Title

To increase the overall quality of the viewing experience and/or the perceived quality of the media title 128 in the mind of user 104, the compute instance 110 implements, without limitation, an interactive streaming application 130. The interactive streaming application 130 personalizes the playback of the media title 128 for the user 104 based on interactions between the user 104 and the IoT device 106.

As shown, the interactive streaming application 130 resides in the memory 116 of the compute instance 110 and executes on the processor 112 of the compute instance 110. In some embodiments, the interactive streaming application 130 includes, without limitation, a narrative personalization engine 160 and a movement recognition engine 140. In some alternate embodiments, the functionality of the interactive streaming application 130 can be distributed across any number of applications and/or subsystems that execute on any number of compute instances 110 in any combination.

When the interactive streaming application 130 receives a request to playback the media title 128 via the client device 102, the interactive streaming application 130 acquires the narrative database 120 that is associated with the media title 128. The interactive streaming application 130 can acquire the narrative database 120 in any technically feasible fashion. For instance, in some embodiments, the narrative database 120 is stored in a media library, and the interactive streaming application 130 retrieves the narrative database 120 from the media library.

As shown, the narrative database 120 includes, without limitation, the chunks 122(1)-122(N), branches 124(1)-124 (L), any amount and type of beat metadata 126, and the media title 128, where L can be any positive integer. Each of the branches 124(1)-124(L) specifies, without limitation, a sequence of any number of the chunks 122(1)-122(N) in any combination and/or order. Although not shown, in one example, the branch 124(1) could specify the chunks 122 (1)-122(7), and the branch 124(2) could specify the chunks 122(54), 122(21)-122(23), and 122(29). In some embodiments, L is equal to 1 and the singe branch 124(1) therefore specifies a predetermined linear narrative. The branches 124(1)-124(L) are also referred to herein individually as "the branch 124" and collectively as "the branches 124." The order of the sequence of the chunks 122 associated with the branch 124 is also referred to herein as a "default linear playback order" associated with the branch 124.

The beat metadata 126 specifies, without limitation, any number of characteristics that are relevant to the playback of the media title 128 for any number of the chunks 122 and/or any number of the branches 124. In some embodiments, any number of characteristics may be specified using one or more consistent sets of labels and/or categories. As persons skilled in the art will recognize, using consistent labels and/or categories increases the scalability of the interactive streaming application 130 across different medias titles 128, different users 104, and different IoT devices 106.

In some embodiments, the beat metadata 126 specifies, without limitation, a different narrative label (not shown) for each of the chunks 122 and, optionally, for any number of the branches 124. Each narrative label specifies a part of a narrative, such as "start of exposition," that characterizes the associated chunk 122 or branch 124. In the same or other embodiments, the beat metadata 126 specifies, without limitation, a different genre (not shown) for each of the chunks 122 and, optionally, any number of the branches 124. Some examples of genres are, without limitation, horror, romance, comedy, etc.

In some embodiments, the beat metadata 126 specifies, without limitation, any amount of chronological data for each of the chunks 122 with respect to an overall chronology associated with the media title 128. In some such embodiments, the chronological data includes, without limitation, any number of chronological points in time associated with the media title 128. For example, chronological data for the chunk 122(1) could specify, without limitation, the days during which the events depicted in the chunk 122(1) occur with respect to a chronology associated with the events depicted across the chunks 122.

In some alternate embodiments, the narrative database 120 can specify any number and/or types of constraints between the branches 124 in any technically feasible fashion. For instance, in some alternate embodiments, the narrative database 120 species any number and/or type of user decision points and/or bottleneck points between any number of the branches 124 and/or subsets of the branches 124. A user decision point specifies a frame that is associated with a constraint that the frame is followed by one of a list of other chunks 122 and/or branches 124. A user decision point refers to a frame that presents multiple user choices, where each user choice is associated with a different one of the branches 124. A bottleneck point specifies a frame at which at least two of the branches 124 merge. As persons skilled in the art will recognize, conventional narratives that include user decision points are commonly referred to as "branching narratives" and each user decision point results in a playback interruption while the user selects one of the user choices.

To playback of the media title 128 for the user 104, the interactive streaming application 130 causes the narrative personalization engine 160 to incrementally generate a personalized narrative 198. The narrative personalization engine 160 initially determines a playback chunk 192(1) from the chunks 122 and sets the personalized narrative 198 equal to the playback chunk 192(1). Subsequently, the narrative personalization engine 160 determines the playback chunk 192(2) from the chunks 122 and appends the playback chunk 192(2) to the personalized narrative 198. The narrative personalization engine 160 continues in this fashion until the playback of the media title 128 is complete or terminated (e.g., by the user 104 or the client device 102). Accordingly, the length of the personalized narrative 198 increases over time.

For explanatory purpose only, the personalized narrative 198 is depicted in FIG. 1 at a point in time when the playback of the media title 128 is complete. As shown, the personalized narrative 198 includes, without limitation, the playback chunks 192(1)-192(P), where P can be any positive integer. In some embodiments, each of the playback chunks 192(1)-192(P) is equal to a different one of the chunks 122 in any order and in any combination. In the same or other embodiments, any number of the chunks 122(1)-122(N) can be omitted from the personalized narrative 198. The playback chunks 192(1)-192(P) are also referred to herein individually as "the playback chunk 192" and collectively as "the playback chunks 192."

When the narrative personalization engine 160 adds the playback chunk 192(x), where x is any integer between 1 and P, to the personalized narrative 198, the interactive streaming application 130 transmits the playback chunk 192(x) to the client device 102. The personalized narrative 198 therefore specifies a dynamically determined playback order for any number of the chunks 122.

In some embodiments, the narrative personalization engine 160 and/or the interactive streaming application 130 determine a playback rate (not shown) at which the narrative personalization engine 160 adds new playback chunks 192 to the personalized narrative 198. The narrative personalization engine 160 and/or the interactive streaming application 130 can determine the playback rate in any technically feasible fashion based on a goal of allowing the client device 102 to playback the media title 128 without interruptions. For instance, in some embodiments, the interactive streaming application 130 includes, without limitation, functionality that dynamically adapts the playback rate based on a network connection between the interactive streaming application 130 and the client device 102.

The narrative personalization engine 160 implements, without limitation, any number and/or types of reinforcement-learning techniques to determine the playback chunks 192. As persons skilled in the art will recognize, conventional applications of reinforcement-learning involve an avatar agent performing actions to learn how to run in a simulated physics environment. By contrast, the narrative personalization engine 160 learns which of the chunks 122 to sequentially append to the personalized narrative 198 in order to reach and/or optimize for a playback goal (not shown) based on iterative interactions between the user 104 and the IoT device 106.

The playback goal can be any type of goal that is relevant to the viewing experience of the user 104. In some embodiments, the narrative personalization engine 160 optimizes the personalized narrative 198 as per a playback goal that correlates to the interest of the user 104 in the media title 128. For instance, in some embodiments, the playback goal is that the user 104 views the media title 128 for a predetermined amount of time (e.g., for at least twenty-five minutes).

The IoT device 106 can be any physical object that is accessible to the user 104 and is capable of communicating with the compute instance 110 via the internet in any technically feasible fashion. In some embodiments, the IoT device 106 is a toy that the user 104 can interact with physically (e.g., move). For example, the IoT device 106 could be, without limitation, an action figure, a doll, a wand, a toy vehicle, a stuffed toy, a ball, or any other type of object. In some embodiments, the IoT device 106 can be any object related to the media title 128. In the same or other embodiments, the IoT device 106 can be any object that can be controlled by the user 104 to interact with the media title 128 in any technically feasible fashion. In some alternate embodiments, the IoT device 106 is replaced with any type of physical device that is accessible to the user 104 and is capable of communicating with the compute instance 110 in any technically feasible fashion instead of via the internet.

The IoT device 106 can be under the control of the user 104 for any number of intervals of time during the playback of the media title 128. In some embodiments, the IoT device 106 can be under the control of the user 104 during the entire playback of the media title 128.

The narrative personalization engine 160 can learn based on any amount and/or types of interactive interactions between the user 104 and the IoT device 106 in any technically feasible fashion. As shown, in some embodiments, the narrative personalization engine 160 learns based on input states 150(1)-150(S), where S can be any positive integer. Each of the input states 150(1)-150(S) reflects an interaction between the user 104 and the IoT device 106 while the user 104 views an associated and consecutive subset of the playback chunks 192. Furthermore, each of the input states 150(1)-150(S) is associated with a different interval of time during the playback of the media title 128. The input states 150(1)-150(S) are also referred to herein individually as "the input state 150" and collectively as "the input states 150."

For explanatory purposes only, the playback chunks 192 are depicted within the personalized narrative 198 in a playback order along a playback timeline 194. The playback timeline 194 spans from the point in time at which the client device 102 displays the first frame of the playback chunk 192(1) to the point in time at which the client device 102 displays the last frame of the playback chunk 192(P).

Furthermore, the input states 150 are differentiated via parenthetical alphanumeric character(s) that identify the temporal order of the input states 150 with respect to the playback timeline 194 where needed. More specifically, the input state 150(1) is associated with an earlier time interval along the playback timeline 194 than any of the other input states 150, and the input state 150(S) is associated with a later time interval along the playback timeline 194 than any of the other input states 150. In some embodiments, S is equal to 3 and the input state 150(2) is associated with one of the playback chunks 192(32)-192(P−1). In some other embodiments, S is greater than 4, and each of the input states 150(2)-150(S−1) is associated with a different one of the playback chunks 192(32)-192(P−1).

During the playback of the media title 128, the movement recognition engine 140 generates the input states 150(1)-150(S) based on a tracking stream 108, the narrative database 120, and the personalized narrative 198. The tracking stream 108 includes, without limitation, any amount and/or type of data that indicates interactions between the user 104 and the IoT device 106. In some embodiments, the tracking stream 108 includes, without limitation, positions in space associated with the IoT device 106. In the same or other embodiments, the tracking stream 108 reflects how the user 104 moves the IoT device 106.

The tracking stream 108 can be generated in any technically feasible fashion. In some embodiments, the interactive streaming application 130, the movement recognition engine 140, a playback application executing on the client device 102, the IoT device 106, any number and types of other software applications, or any combination thereof can execute any number of tracking operations to generate the tracking stream 108. In the same or other embodiments, the IoT device 106 can be associated with any number and/or types of sensors (e.g., one or more accelerometers, gyroscopes, GPS receivers, magnetometers, etc.) that facilitate any number and/or types of tracking operations.

In some embodiments, the IoT device 106 can be associated with any number and/or types of biometric sensors (e.g., one or more pressure sensors, galvanic skin response sensors, heart rate sensors, etc.) that measure aspects of any number and/or types of behavior and/or characteristics of the user 104 to facilitate any number and/or types of biofeedback operations. For instance, in some embodiments, any number of pressure sensors embedded in the IoT device 106 enable the interactive streaming application 130 to detect when the user 104 squeezes the IoT device 106.

The movement recognition engine 140 can generate the input states 150 in any technically feasible fashion. In some embodiments, the movement recognition engine 140 repeatedly executes a state generation process to generate the input states 150(1)-150(S). During the $u^{th}$ execution of the state generation process, where u is an integer from 1 to S, the movement recognition engine 140 generates the input state 150(u).

In some embodiments, the input state 150(u) includes, without limitation, the movement 152(u) and the narrative beat 154(u). The movement 152(u) is an estimated classification of the movement of the IoT device 106 that occurs during the time interval associated with the input state 150(u). In some embodiments, the movement 152(u) is specified via a consistent set of classifications that are agnostic with respect to the IoT device 106. For example, the movement 152(u) could specify the classification of the movement of a toy car or the movement of a wand.

The narrative beat 154(u) specifies any amount of the beat metadata 126 that is associated with any number of the playback chunks 192 displayed via the client device 102 during the movement 152(u). In some embodiments, the narrative beat 154(u) is specified via a consistent set of labels that are agnostic with respect to the media title 128.

As described in greater detail below in conjunction with FIG. 2, to generate the input state 150(1), the movement recognition engine 140 performs any number and/or types of discretization operations on the tracking stream 108 to generate discrete inputs (not shown in FIG. 1). The movement recognition engine 140 uses a trained classifier (not shown in FIG. 1) to classify a group of one or more consecutive discrete inputs as the movement 152(1). The movement recognition engine 140 sets the narrative beat 154(1) equal to any amount of the beat metadata 126 associated with any number of the playback chunks 192 displayed via the client device 102 during the movement 152(1).

The movement recognition engine 140 repeatedly re-executes the state generation process until the tracking stream 108 terminates or the interactive streaming application 130 terminates the playback of the media title 128. When the movement recognition engine 140 generates the input state 150(u), where u is an integer between 1 and S, the interactive streaming application 130 transmits the input state 150(u) to the narrative personalization engine 160.

Figure 3:
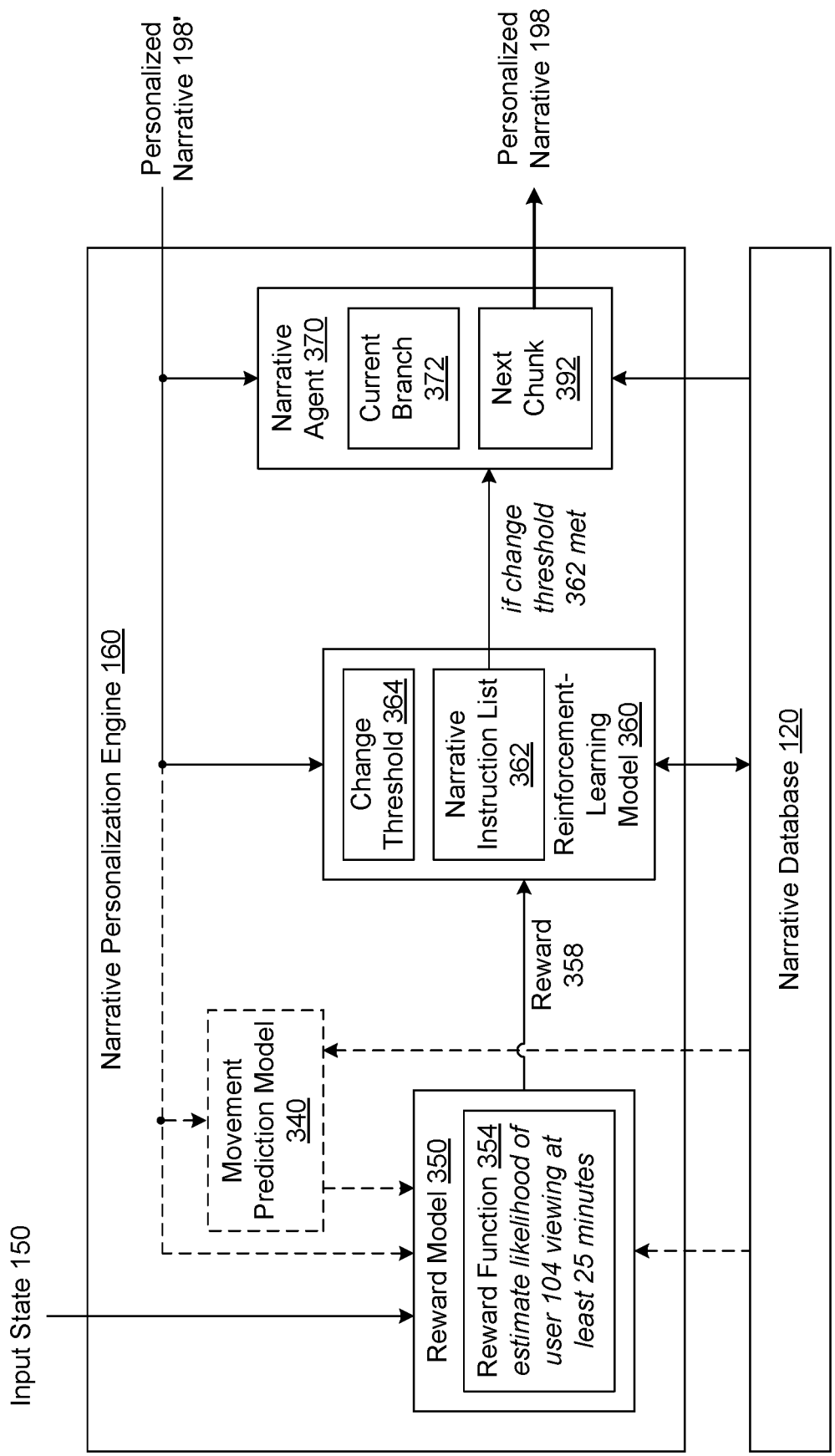
FIG. 3 is a more detailed illustration of the narrative personalization engine of FIG. 1, according to various embodiments.

As described in greater detail in conjunction with FIG. 3, in some embodiments, the narrative personalization engine 160 implements an overall playback strategy to determine the playback chunks 192 and can override and/or refine the overall playback strategy based on the input states 150(1)-150(S). More precisely, upon receiving each of the input states 150, the narrative personalization engine 160 determines whether and/or how to override and/or alter the overall playback strategy and/or whether and/or how to alter the narrative database 120. In some embodiments, the narrative personalization engine 160 can generate and subsequently override and/or alter the overall playback strategy, and/or alter the narrative database 120 in any technically feasible fashion.

For instance, in some embodiments, the interactive streaming application 130 or any other software application bootstraps the narrative personalization engine 160 to an appropriate starting point via offline simulations prior to playing back the media title 128 to any users 104. In some embodiments, the offline simulations predict how any number of users 104 would respond during the playback of any number of media titles 128 via any number of dynamically generated personalized narratives 198.

In some embodiments, during an offline simulation mode, the narrative personalization engine 160 learns an overall playback strategy that the narrative personalization engine 160 subsequently refines in real-time based on the input states 150(1)-150(S). In the same or other embodiments, the narrative personalization engine 160 implements any number and/or types of rules, any number and/or types of algorithms, any number and/or type of machine learning techniques, or any combination thereof to establish an overall playback strategy.

For instance, in some embodiments, the narrative database 120 specifies a default playback order (not shown) that species any number of the branches 124. In a complementary fashion, the narrative personalization engine 160 implements the overall playback strategy of sequentially playing back the branches 124 in accordance with the default playback order. In some embodiments, the total number of branches 124 is one, and the narrative personalization engine 160 implements an overall strategy of playing back the chunks 122 in the order specified via the branch 124(1).

In some embodiments, upon receiving each of the input states 150, the narrative personalization engine 160 computes a reward (not shown in FIG. 1) based on a reward function that is associated with a playback goal. In some embodiments, the reward function estimates an effectiveness of the personalized narrative 198 with respect to the playback goal based on the behavior of the user 104 as per the input state 150.

The narrative personalization engine 160 then computes a narrative instruction list (not shown in FIG. 1) based on the input state 150. The narrative instruction list includes, without limitation, any number of narrative instructions that when executed, are intended to increase the effectiveness of the personalized narrative 198. Each of the narrative instructions can specify, without limitation, any number of the playback chunks 192, an exception to the overall playback strategy, a change to the overall playback strategy, a change to the narrative database 120, or any combination thereof in any technically feasible fashion. For instance, in some embodiments, each of the narrative instructions can specify the next playback chunk 192, a change to the branch 124 that is currently selected for playback, a change to a default playback order of the branches 124, a change to the narrative database 120, or any combination thereof.

The narrative personalization engine 160 can generate the narrative instruction list in any technically feasible fashion. For instance, in some embodiments the narrative personalization engine 160 learns a policy that maps the input state 150 to the narrative instruction list. In the same or other embodiments, the narrative personalization engine 160 includes, without limitation, a neural network (e.g., a recurrent neural network) that implements any number of machine learning techniques to determine the narrative instruction list based on the input state 150.

In some embodiments, the narrative personalization engine 160 unconditionally executes the narrative instruction list (i.e., executes the narrative instructions included in the narrative instruction list) before or as part of selecting the next playback chunk 192. In other embodiments, the narrative personalization engine 160 determines whether executing the narrative instruction list is likely to increase the effectiveness of the personalized narrative 198 by more than a change threshold (not shown in FIG. 1). If the narrative personalization engine 160 determines that executing the narrative instruction list is likely to increase the effectiveness of the personalized narrative 198 by more than the change threshold, then the narrative personalization engine 160 executes the narrative instruction list before or as part of selecting the next playback chunk 192. Otherwise, the narrative personalization engine 160 disregards the narrative instruction list.

As persons skilled in the art will recognize, the narrative personalization engine 160 learns preferences of the user 104 in order to reach the playback goal. As the narrative personalization engine 160 learns the preferences of the user 104, the narrative personalization engine 160 tailors the personalized narrative 198 to better match the preference of the user 104. As a result, the personalized narrative 198 can increase the overall quality of the viewing experience and/or the perceived quality of the media title 128 in the mind of the user 104 relative to a predetermined narrative.

In some alternate embodiments, the media title 128 is associated with constraints that specify a branching narrative, and the narrative database 120 includes, without limitation, a list of the current possible branches 124. When the narrative personalization engine 160 reaches a user decision point, the narrative personalization engine 160 can automatically selects one of the branches 124 instead of interrupting the playback of the media title 128. The narrative personalization engine 160 removes the other branches 124 associated with the user decision point from the list of current possible narrative branches 124 as per the constraints. Because the narrative personalization engine 160 continually learns how to optimize the personalized narrative 198 for the user 104 based on the input states 150, the narrative personalization engine 160 automatically and properly navigates the branching narrative as per the preferences of the user 104.

The narrative personalization engine 160 and/or the interactive streaming application 130 can determine that the playback of the media title 128 is complete or terminated in any technically feasible fashion. In some embodiments, the narrative personalization engine 160 determines that the playback of the media title 128 is complete based on the beat metadata 126.

In some embodiments, the interactive streaming application 130 stores at least a portion of the narrative personalization engine 160 after the playback of the media title 128. In some embodiments, the interactive streaming application 130 uses the stored portion of the narrative personalization engine 160 as a starting point to personalize the playback of any number of other media titles 128 for the user 104. In the same or other embodiments, the interactive streaming application 130 uses the stored portion of the narrative personalization engine 160 as a starting point to personalize the playback of the media title 128 for any number of other users 104. In some embodiments, the interactive streaming application 130 uses the stored portions of the narrative personalization engine 160 as a starting point to personalize the playback of any number of media titles 128 for any number of users 104.

For explanatory purposes only, some exemplary values for the input state 150(1), the input state 150(S), and the personalized narrative 198 are depicted in italics. Furthermore, the beat metadata 126 includes, without limitation, a narrative label (not shown) for each of the chunks 122 and each of the branches 124. As shown, to initiate the playback of the media title 128, the narrative personalization engine 160 sets the playback chunk 192(1) equal to the chunk 122(1) that is associated with the narrative label "start of exposition." The narrative personalization engine 160 then sets the playback chunk 192(2) equal to the chunk 122(2) that is associated with the narrative label "exposition."

While the client device 102 plays back the playback chunk 192(2), the user 104 becomes bored and makes a circular gesture with the IoT device 106. In response to the circular gesture, the movement recognition engine 140 generates the input state 150(1) that includes the movement 152(1) "circular" and the narrative beat 154(1) "exposition" (i.e., the narrative label associated with the playback chunk 192(2)). The interactive streaming application 130 transmits the input state 150(1) to the narrative personalization engine 160.

Based on the input state 150(1), the narrative personalization engine 160 skips the chunks 122 corresponding to the remainder of the exposition portion of the media title 128 and sets the playback chunk 192(3) equal to the chunk 122(8) that is associated with the narrative label "start of first rising action." In this fashion, the narrative personalization engine 160 attempts to regain the interest of the user 104. Subsequently, the narrative personalization engine 160 determines the playback chunks 192(4)-192(31) in accordance with the overall playback strategy and the input states 150(2)-150(S−1) (not shown) derived from the tracking stream 108 during the playback of the playback chunks 192(4)-192(30).

While the client device 102 plays back the playback chunk 192(31), the user 104 becomes excited and shakes the IoT device 106. Because the playback chunk 192(31) is equal to the chunk 122(52) that is associated with the narrative label "second climax," the movement recognition engine 140 generates the input state 150(S) that includes, without limitation, the movement 152(S) of "shaking" and the narrative beat 154(S) of "second climax." The interactive streaming application 130 then transmits the input state 150(S) to the narrative personalization engine 160.

Based on the input state 150(S), the narrative personalization engine 160 selects the branch 124(L−1) (not shown) that is associated with the narrative label "$2^{nd}$ extended climax." The selected branch 124(L−1) includes, without limitation, the chunk 122(70) that is associated with the narrative label "start of second extended climax" and the chunk 122(71) that is associated with the narrative label "end of second extended climax." The narrative personalization engine 160 sequentially sets the playback chunks 192(32) and 192(33) equal to the chunks 122(70) and 122(71), respectively. The narrative personalization engine 160 then sets the playback chunk 192(34) equal to the chunk 122(53) that is associated with the narrative label "start of second falling action."

Subsequently, the narrative personalization engine 160 sequentially selects playback chunks 192(34)-192(P) based on the overall playback strategy. Because the playback chunk 192(P) is equal to the chunk 122(65) that is associated with the narrative label "final resolution," the narrative personalization engine 160 stops adding playback chunks 192 to the personalized narrative 198 after appending the playback chunk 192(P) to the personalized narrative 198.

As the above example illustrates, unlike prior-art techniques, the interactive streaming application 130 efficiently and automatically personalizes the playback of the media title 128 for the user 104. Furthermore, in some embodiments, the interactive streaming application 130 automatically personalizes the playback of any number of media titles 128 for any number of users 104 to reflect individual preferences of the users 104. Because the interactive streaming application 130 personalizes the playback of the media title 128 without interrupting the playback, the interactive streaming application 130 can effectively increase the overall quality of the viewing experience across a broad range of users 104.

Note that the techniques described herein are illustrative rather than restrictive and can be altered without departing from the broader spirit and scope of the invention. Many modifications and variations on the functionality provided by the interactive streaming application 130, the movement recognition engine 140, and the narrative personalization engine 160 will be apparent to those of ordinary skill in the art without departing from the scope and spirit of the described embodiments.

It will be appreciated that the system 100 shown herein is illustrative and that variations and modifications are possible. For example, the functionality provided by the interactive streaming application 130, the movement recognition engine 140, and the narrative personalization engine 160 as described herein may be integrated into or distributed across any number of software applications (including one), and any number of components of the system 100. Further, the connection topology between the various units in FIG. 1 may be modified as desired.

Figure 2:
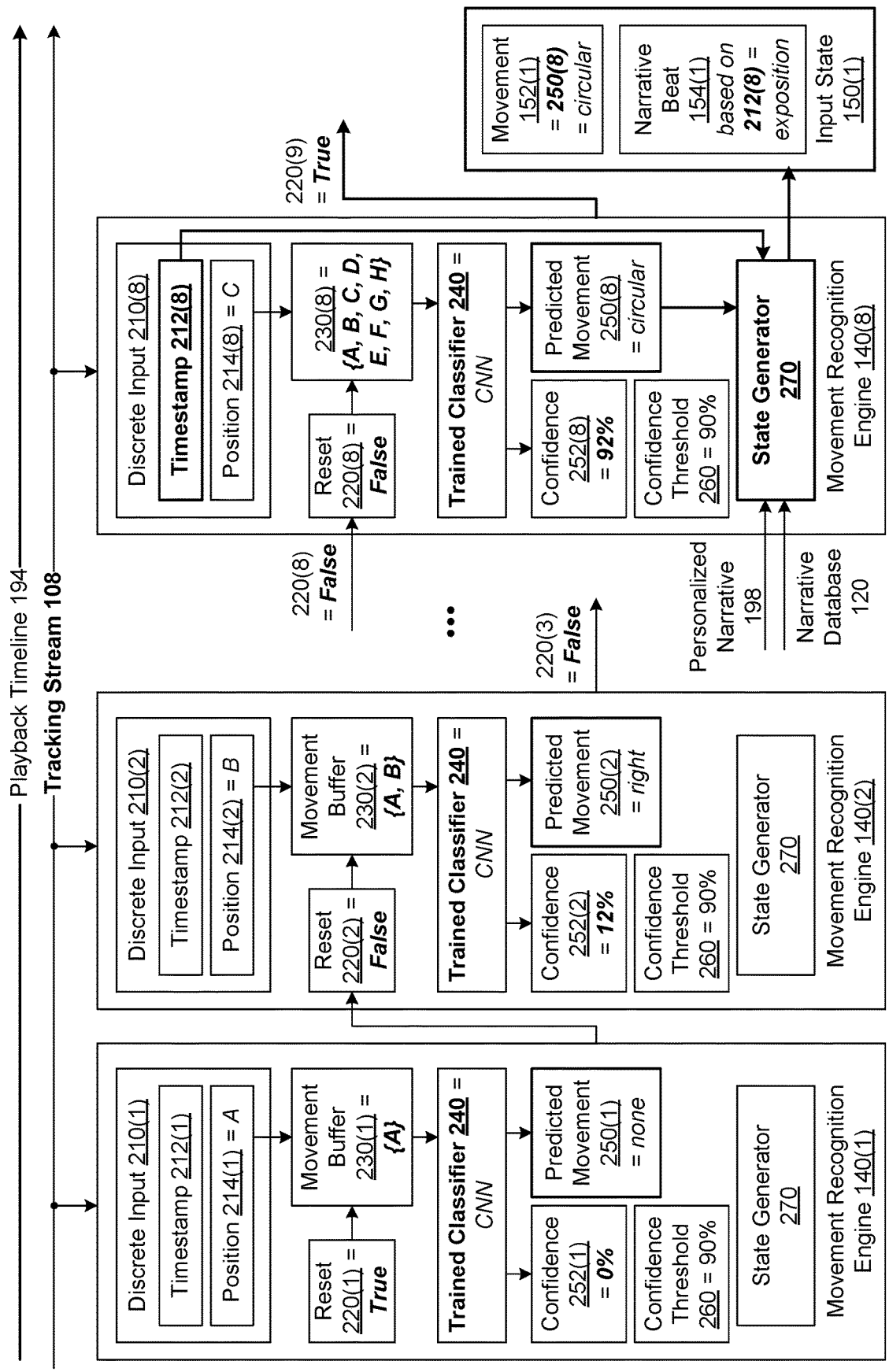
FIG. 2 illustrates a sequence of operations performed by the movement recognition engine of FIG. 1 when generating one of the input states, according to various embodiments.

FIG. 2 illustrates a sequence of operations performed by the movement recognition engine 140 of FIG. 1 when generating one of the input states 150, according to various embodiments. More precisely, FIG. 2 illustrates a sequence of operations performed by the movement recognition engine 140 when generating the input state 150(1).

As described previously herein in conjunction with FIG. 1, as the user 104 views the media title 128 via the client device 102, the user 104 interacts with the IoT device 106. The tracking stream 108 tracks the IoT device 106 in real-time and includes, without limitation, positions in space associated with the IoT device 106. The movement recognition engine 140 discretizes the tracking stream 108 to generate any number of discrete inputs 210(1)-210(D), where D can be any integer that is greater than or equal to 8 and 210(D) is not shown in FIG. 2. The discrete inputs 210(1)-210(D) are also referred to herein individually as "the discrete input 210" and collectively as "the discrete inputs 210."

The movement recognition engine 140 can discretize the tracking stream 108 in any technically feasible fashion. For instance, in some embodiments, the movement recognition engine 140 breaks the tracking stream 108 into segments in real-time, where each segment has a predetermined duration (e.g., a duration of a millisecond). The movement recognition engine 140 generates a new discrete input 210 for each segment.

As shown explicitly for the discrete inputs 210(1), 210(2), and 210(8), in some embodiments, the discrete inputs 210(1)-210(D) include, without limitation, the timestamps 212(1)-212(D) and the positions 214(1)-214(D). The timestamps 212(1)-212(D) are also referred to herein individually as "the timestamp 212" and collectively as "the timestamps 212." The positions 214(1)-214(D) are also referred to herein individually as "the position 214" and collectively as "the positions 214."

The movement recognition engine 140 determines each of the positions 214 based on the positions in space specified in the associated segment of the tracking stream 108. The movement recognition engine 140 can determine the positions 214 in any technically feasible fashion. For instance, in some embodiments, the movement recognition engine 140 sets each of the positions 214 to the average of the positions in space included in the associated segment of the tracking stream 108.

The movement recognition engine 140 sets each of the timestamps 212 equal to a playback time that corresponds to at least a portion of the associated segment of the tracking stream 108. As referred to herein, a "playback time" specifies a point in time relative to the playback timeline 194. As described previously herein in conjunction with FIG. 1, the playback timeline 194 spans from the point in time at which the client device 102 displays the first frame of the playback chunk 192(1) to the point in time at which the client device 102 displays the last frame of the playback chunk 192(P). Accordingly, the timestamps 212(1)-212(D) indicate the playback chunks 192 that are playing back via the client device 102 when the IoT device 106 is at the positions 214(1)-214(D), respectively.

The movement recognition engine 140 and/or any number of other software applications can determine the timestamps 212(1)-212(8) in any technically feasible fashion. As described previously herein, in some embodiments, a playback application executing on the client device 102 stores one or more of the playback chunks 192 as a reserve before displaying any of the playback chunks 192. In such embodiments, the movement recognition engine 140 can communicate with the playback application to establish a temporal mapping between the current time and the playback time. The movement recognition engine 140 can then use the temporal mapping to determine the timestamps 212.

The movement recognition engine 140 sequentially generates and processes the discrete inputs 210 to generate the input states 150. As described previously herein in conjunction with FIG. 1, the input states 150(1)-150(S) include, without limitation, the movements 152(1)-152(S), respectively, and the narrative beats 154(1)-154(S), respectively. The number of discrete inputs 210 that the movement recognition engine 140 generates and processes to generate each of the input states 150(1)-150(S) varies based on the number of discrete inputs 210 that the movement recognition engine 140 requires to reliably predict the movements 152(1)-152(S), respectively.

Over the period of time depicted in FIG. 2, the movement recognition engine 140 sequentially and in real-time breaks the tracking stream 108 into eight segments. For each segment, the movement recognition engine 140 generates and processes a new discrete input 210 in an attempt to reliably predict the movement 152(1). For explanatory purposes only, FIG. 2 depicts multiple snapshots of the movement recognition engine 140, where each snapshot is associated with a different point in time and a different discrete input 210. The snapshots of the movement recognition engine 140 are respectively denoted as the movement recognition engines 140(1)-140(8). Furthermore, the components of the movement recognition engines 140(1)-140(8) are denoted with the parenthetical numbers 1-8, respectively, as needed, and exemplary values for some of the components are depicted in italics.

As shown explicitly for the movement recognition engines 140(1), 140(2), and 140(8), the movement recognition engine 140 includes, without limitation, the discrete input 210, a reset 220, a movement buffer 230, a trained classifier 240, a predicted movement 250, a confidence 252, a confidence threshold 260, and a state generator 270.

The reset 220 is either true or false and indicates whether or not the movement recognition engine 140 is to evaluate the discrete input 210 with respect to previously generated discrete inputs 210. The reset 220(1) is initialized to true. In general, the movement buffer 230 includes, without limitation, an ordered list of any number of the positions 214 corresponding to the discrete inputs 210 that the movement recognition engine 140 has generated since generating the previous input state 150 (if any). At any given point in time, the positions 214 included in the movement buffer 230 are associated with the IoT device 106 across a time interval that varies over time.

The trained classifier 240 is a machine learning model that the movement recognition engine 140 uses to map the movement buffer 230 to the predicted movement 250 and the confidence 252. The trained classifier 240 can be any type of machine learning model and can be trained via any number and/or types of machine learning algorithms in any technically feasible fashion.

As depicted in italics, in some embodiments, the trained classifier 240 is a trained convolutional neural network ("CNN"). In the same or other embodiments, the trained classifier 240 can include, without limitation, a trained random forest, a trained neural network, a trained decision tree, a trained support vector machine, any other technical feasible trained machine learning model, or any combination thereof. In some embodiments, the trained classifier 240 is trained based on a training set that includes, without limitation, a set of movement sequences specifying positions of any number of IoT devices, where each movement sequence is tagged with a corresponding movement classification. In some alternate embodiments, the trained classifier 240 can be replaced or supplemented with any other type of machine learning model. For instance, in some alternate embodiments, the trained classifier 240 is replaced with a generative adversarial network, a cluster-based machine learning model, and/or a classifier ensemble in any combination.

The predicted movement 250 specifies an estimated movement of the IoT device 106 corresponding to the movement buffer 230. The confidence 252 correlates to a likelihood that the predicted movement 250 is accurate. In some alternate embodiments, the trained classifier 240 generates the predicted movement 250 but does not generate the confidence 252, and the techniques described herein are modified accordingly.

The confidence threshold 260 is a minimum threshold of the confidence 252 for which the movement recognition engine 140 generates a new input state 150. The confidence threshold 260 can be any value determined in any technically feasible fashion. As shown in the example of FIG. 2, in some embodiments, the confidence threshold 260 is 90%. If the confidence 252 does not exceed the confidence threshold 260, then the movement recognition engine 140 sets the reset 220 to false and then generates and processes a new discrete input 210.

Otherwise, as described in greater detail below, the state generator 270 generates a new input state 150 based on the predicted movement 250, the most recently generated timestamp 212, the personalized narrative 198, and the narrative database 120. In alternate embodiments, the state generator 270 can generate the new input state 150 based on any number of the timestamps 212, and the techniques described herein are modified accordingly. In the same or other alternate embodiments, the state generator 270 can generate the new input state 150 based on the predicted movement 250 and any amount and/or types of data in any technically feasible fashion.

As shown, the movement recognition engine 140(1) generates the discrete input 210(1) that includes, without limitation the timestamp 212(1) and the position 214(1) of A. Because the reset 220(1) is true, the movement recognition engine 140(1) sets the movement buffer 230(1) equal to the position 214(1) of A. The movement recognition engine 140(1) inputs the movement buffer 230(1) of {A} into the trained classifier 240. In response, the trained classifier 240 outputs the predicted movement 250(1) of none and the confidence 252(1) of 0%. Because the confidence 252(1) does not exceed the confidence threshold 260 of 90%, the movement recognition engine 140(1) sets the reset 220(2) to false.

Subsequently, the movement recognition engine 140(2) generates the discrete input 210(2) that includes, without limitation the timestamp 212(2) and the position 214(2) of B. Because the reset 220(2) is false, the movement recognition engine 140(2) appends the position 214(2) to the movement buffer 230(2). As a result, the movement buffer 230(2) is equal to {A, B}. The movement recognition engine 140(2) inputs the movement buffer 230(2) of {A, B} into the trained classifier 240. In response, the trained classifier outputs the predicted movement 250(2) of right and the confidence 252(2) of 12%. Because the confidence 252(2) does not exceed the confidence threshold 260 of 90%, the movement recognition engine 140(2) sets the reset 220(3) to false.

Although not shown, the movement recognition engines 140(3)-140(7) sequentially generate and process the discrete inputs 210(3)-210(7). As a result, the reset 220(8) is equal to false and the movement buffer 230(7) (not shown) is equal to {A, B, C, D, E, F, G}. As shown, the movement recognition engine 140(8) generates the discrete input 210(8) that includes, without limitation the timestamp 212(8) and the position 214(8) of H. Because the reset 220(8) is false, the movement recognition engine 140(8) appends the position 214(8) to the movement buffer 230(8). The movement recognition engine 140(8) inputs the movement buffer 230(8) of {A, B, C, D, E, F, G, H} into the trained classifier 240. In response, the trained classifier 240 outputs the predicted movement 250(8) of circular and the confidence 252(8) of 92%. Because the confidence 252(8) exceeds the confidence threshold 260 of 90%, the movement recognition engine 140(8) sets the reset 220(9) to true.

The state generator 270 then generates the input state 150(1) based on the predicted movement 250(8) and the timestamp 212(8). As shown, the state generator 270 sets the movement 152(1) equal to the predicted movement 250(8) of circular. The state generator 270 maps the timestamp 212(8) to the playback chunk 192 playing back via the client device 102 during at least a portion of the movement 152(1) based on the personalized narrative 198. Referring back to FIG. 1, the state generator 270 maps the timestamp 212(8) to the playback chunk 192(2) that is equal to the chunk 122(2). The state generator 270 determines the narrative beat 154(1) based on the beat metadata 126 that is associated with the chunk 122(2) and therefore the playback chunk 192(2). The state generator 270 can determine the narrative beat 154(1) in any technically feasible fashion.

For explanatory purposes only, in the embodiment depicted in FIG. 2, the state generator 270 sets the narrative beat 154(1) equal to the narrative label "exposition" that is associated with the chunk 122(2) and is included in the beat metadata 126. As persons skilled in the art will recognize, the input state 150(1) specifies a mapping between the narrative beat 154(1) and the movement 152(1). The movement 152(1) therefore indicates a response of the user 104 that is associated with the narrative beat 154(1).

Optimizing a Personalized Narrative Using a Reinforcement-Learning Model

FIG. 3 is a more detailed illustration of the narrative personalization engine 160 of FIG. 1, according to various embodiments. As described previously herein in conjunction with FIG. 1, the narrative personalization engine 160 implements, without limitation, any number and/or types of reinforcement-learning techniques and/or reinforcement-learning operations to generate the personalized narrative 198. The narrative personalization engine 160 is also referred to herein as a narrative machine learning model and a narrative reinforcement-learning model.

As shown, the narrative personalization engine 160 includes, without limitation, a narrative agent 370, a reward model 350, and a reinforcement-learning model 360. In operation, the narrative personalization engine 160 iteratively selects a next chunk 392 from the chunks 122 and appends the next chunk 392 to the personalized narrative 198 as a new playback chunk 192. For explanatory purposes only, FIG. 3 depicts a single iteration and uses 198' to denote a snapshot of the personalized narrative 198 before the narrative personalization engine 160 appends the next chunk 392 to the personalized narrative 198. Accordingly, the narrative personalization engine 160 appends the next chunk 392 to the personalized narrative 198' to generate the personalized narrative 198.

As shown, the reward model 350 computes a reward 358 based on the input state 150. In some alternate embodiments, the reward model 350 can compute the reward 358 based on the input state 150 and any amount of additional data (e.g., biometric sensor data). As depicted with dashed arrows, in some alternate embodiments, the reward model 350 computes the reward 358 based on the input state 150, the personalized narrative 198' and/or the narrative database 120.

The reward 358 correlates to the effectiveness of the personalized narrative 198' with respect to the user 104. As referred to herein, the effectiveness of the personalized narrative 198' refers to the overall quality of the viewing experience and/or the overall quality of the media title 128 in the mind of the user 104 during the playback of the media title 128. In some embodiments, the effectiveness of the personalized narrative 198' is related to a likelihood of reaching one or more playback goals (not shown).

As shown, in some embodiments, the reward model 350 computes the reward 358 based on a reward function 354. The reward model 350 can implement any type of reward function 354 in any technically feasible fashion. In some embodiments, the reward function 354 is a positive reward function that is selected to provide positive reinforcement to the reinforcement-learning model 360 when the behavior of the user 104 indicates that the reinforcement-learning model 360 has increased the effectiveness of the personalized narrative 198' with respect to the user 104. In some other embodiments, the reward function 354 is a negative reward function that is selected to provide negative reinforcement to the reinforcement-learning model 360 when the behavior of the user 104 indicates that the reinforcement-learning model 360 has decreased the effectiveness of the personalized narrative 198' with respect to the user 104. In yet other embodiments, the reward function 254 is a composite reward function that provides, without limitation, the functionalities as described herein of both a positive reward function and a negative reward function.

In some embodiments, the movement recognition engine 140 and/or the narrative personalization engine 160 can generate any amount and/or type of data that indicates that the reinforcement-learning model 360 has decreased the effectiveness of the personalized narrative 198' with respect to the user 104. For instance, in some embodiments, if the tracking stream 108 indicates that the user 104 has put the IoT device 106 down, then the movement recognition engine 140 generates the input state 150 specifying the movement 152 of "set aside." In the same or other embodiments, if the movement recognition engine 140 determines that the IoT device 106 has not moved for at least a predetermined amount of time, then the movement recognition engine 140 generates the input state 150 specifying the movement 152 of "none."

In some embodiments, the reward function 354 is related to one or more playback goals. In some embodiments, and as depicted in italics, the reward function 354 estimates a likelihood of the user 104 viewing the media title 128 for at least 25 minutes. In the same or other embodiments, the reward function 354 can be a weighted combination of optimization objectives associated with any number playback goals. For instance, in some embodiments, the reward function 354 is a weighted combination of maximizing the length of time that the user 104 views the media title 128 and minimizing the number of the chunks 122 that are repeated in the personalized narrative 198'.

In some alternate embodiments, and as depicted via dashed boxes and arrows, the narrative personalization engine 160 also includes, without limitation, a movement prediction model 340. The movement prediction model 340 is a machine learning model that predicts the movements that a human would make with the IoT device 106 or any similar device when viewing the media title 128 in accordance with the personalized narrative 198. The movement prediction model 340 may be any type of machine learning model and can be generated in any technically feasible fashion.

In some embodiments, the movement prediction model 340 can be used to bootstrap the narrative personalization engine 160 to an appropriate starting point via offline simulations prior to playing back the media title 128 to any users 104. In an exemplary offline simulation mode, the movement prediction model 340 periodically predicts the input states 150 based on the personalized narrative 198' and the narrative database 120. In some alternate embodiments, the movement prediction model 340 is a separate software application, and the narrative personalization engine 160 receives the input states 150 from the movement prediction model 340 instead of the movement recognition engine 140 in the offline simulation mode.

As shown, the reinforcement-learning model 360 includes, without limitation, a narrative instruction list 362 and a change threshold 364. The reinforcement-learning model 360 computes the narrative instruction list 362 based on the reward 358, the personalized narrative 198', and the narrative database 120. The narrative instruction list 362 includes, without limitation, any number of narrative instructions (not shown) that, when executed by the reinforcement-learning model 360 and/or the narrative agent 370, are intended to increase the effectiveness of the personalized narrative 198.

Each of the narrative instructions can specify, without limitation, any number of the playback chunks 192, an exception to the overall playback strategy, a change to the overall playback strategy, a change to the narrative database 120, or any combination thereof in any technically feasible fashion. For instance, in some embodiments, each of the narrative instructions can specify, without limitation, the next chunk 392, a current branch 372 that is selected for playback, a change to a default playback order of the branches 124, a change to the narrative database 120, or any combination thereof, The reinforcement-learning model 360 can generate the narrative instruction list 362 in any technically feasible fashion. In some embodiments, the reinforcement-learning model 360 is a Deep Q Network that uses deep Q-learning techniques to generate the narrative instruction list 362. In the same or other embodiments, the reinforcement-learning model 360 learns a policy that maps the reward 358 to the narrative instruction list 362. In the same or other embodiments, the reinforcement-learning model 360 includes, without limitation, a neural network (e.g., a recurrent neural network) that implements any number of machine learning techniques to determine the narrative instruction list 362 based on the reward 358.

In some embodiments, the reinforcement-learning model 360 determines whether to execute the narrative instruction list 362 based on the change threshold 364. The change threshold 364 indicates a minimum predicted improvement in the effectiveness of the personalized narrative 198. The reinforcement-learning model 360 can implement any type of change threshold 364 in any technically feasible fashion.

For instance, in some embodiments, the change threshold 364 specifies a minimum increase in the reward 358. In the same or other embodiments, the reinforcement-learning model 360 estimates a predicted reward (not shown) associated with executing the narrative instruction list 362. If the predicted reward does not exceed the change threshold 364, then the reinforcement-learning model 360 disregards the narrative instruction list 362. If, however, the predicted reward exceeds the change threshold 364, then the reinforcement-learning model 360 executes any number of the narrative instructions included in the narrative instruction list 362 and forwards the remaining narrative instructions to the narrative agent 370.

In some alternate embodiments, the change threshold 364 is omitted from the reinforcement-learning model 360, and the reinforcement-learning model 360 executes the narrative instruction list 362 unconditionally. More precisely, the reinforcement-learning model 360 executes any number of the narrative instructions included in the narrative instruction list 362 and forwards the remaining narrative instructions to the narrative agent 370.

The reinforcement-learning model 360 can determine which of the narrative instructions to directly execute and which of the narrative instructions to forward to the narrative agent 370 in any technically feasible fashion. For instance, in some embodiments, the reinforcement-learning model 360 can generate narrative instructions that specify changes to the narrative database 120. In some such embodiments, and as depicted with a dashed arrow, the reinforcement-learning model 360 executes any narrative instructions that involve modifying the narrative database 120 and forwards the remaining narrative instructions to the narrative agent 370.

The narrative agent 370 incrementally generates the personalized narrative 198 based on the narrative database 120 and any number and/or types of narrative instructions received from the reinforcement-learning model 360. The narrative agent 370 can generate the personalized narrative 198 in any technically feasible fashion. For instance, in some embodiments, the narrative agent 370 repeatedly determines the next chunk 392 from the chunks 122 and appends the next chunk 392 to the personalized narrative 198' as a new playback chunk 192. In the same or other embodiments, the narrative agent 370 adds new playback chunks 192 to the personalized narrative 198' at a playback rate. The narrative agent 370 may determine the playback rate in any technically feasible fashion and the playback rate may change over time.

The narrative agent 370 can determine the next chunk 392 in any technically feasible fashion. For instance, in some embodiments, the narrative agent 370 implements an overall playback strategy (not shown) to determine the next chunk 392 and overrides and/or refines the overall playback strategy based on the narrative instructions received from the reinforcement-learning model 360. The narrative agent 370 and/or the narrative personalization engine 160 can initially determine the overall playback strategy in any technically feasible fashion.

In some embodiments, the narrative agent 370 implements any number and/or types of rules, any number and/or types of algorithms, any number and/or type of machine learning techniques, or any combination thereof to initially establish the overall playback strategy. For instance, in some embodiments, the narrative agent 370 learns the overall playback strategy during the offline simulation mode described above in conjunction with the movement prediction model 340.

In some embodiments, the narrative agent 370 includes, without limitation, a current branch 372. At any point in time, the current branch 372 specifies one of the branches 124. As part of the overall playback strategy, the narrative agent 370 sequentially sets the next chunk 392 equal to each of the chunks 122 included in the current branch 372 in accordance with an associated linear order. In some embodiments, the total number of branches 124 is one, and the narrative agent 370 implements an overall strategy of sequentially setting the next chunk 392 equal to each of the chunks 122 in the order specified via the branch 124(1).

In some embodiments, the narrative agent 370 determines the current branch 372 based on the overall playback strategy. For instance, in some embodiments, the narrative agent 370 determines the current branch 372 based on a default playback order corresponding to the order in which the branches 124 are listed in the narrative database 120. Initially, the narrative agent 370 sets the current branch 372 equal to the branch 124(1) and the next chunk 392 equal to the first chunk 122 included in the branch 124(1). In accordance with the overall playback strategy, after sequentially setting the next chunk 392 equal to each of the remaining chunks 122 included in the branch 124(1), the narrative agent 370 sets the current branch 372 equal to the branch 124(2) and the next chunk 392 equal to the first chunk 122 included in the branch 124(2).

At any point-in-time during the playback of the media title 128, the narrative agent 370 can receive one or more narrative instructions from the reinforcement-learning model 360. The narrative agent 370 executes the narrative instructions in any technically feasible fashion. In some embodiments, as part of executing each narrative instruction, the narrative agent 370 determines the next chunk 392, changes the current branch 372, alters a default playback order of the chunks 122 and/or the branches 124, alters the overall playback strategy, or any combination thereof. In some alternate embodiments, the next chunk 392 and/or the current branch 372 are omitted from the narrative agent 370 and the techniques described herein are modified accordingly.

Figure 4:
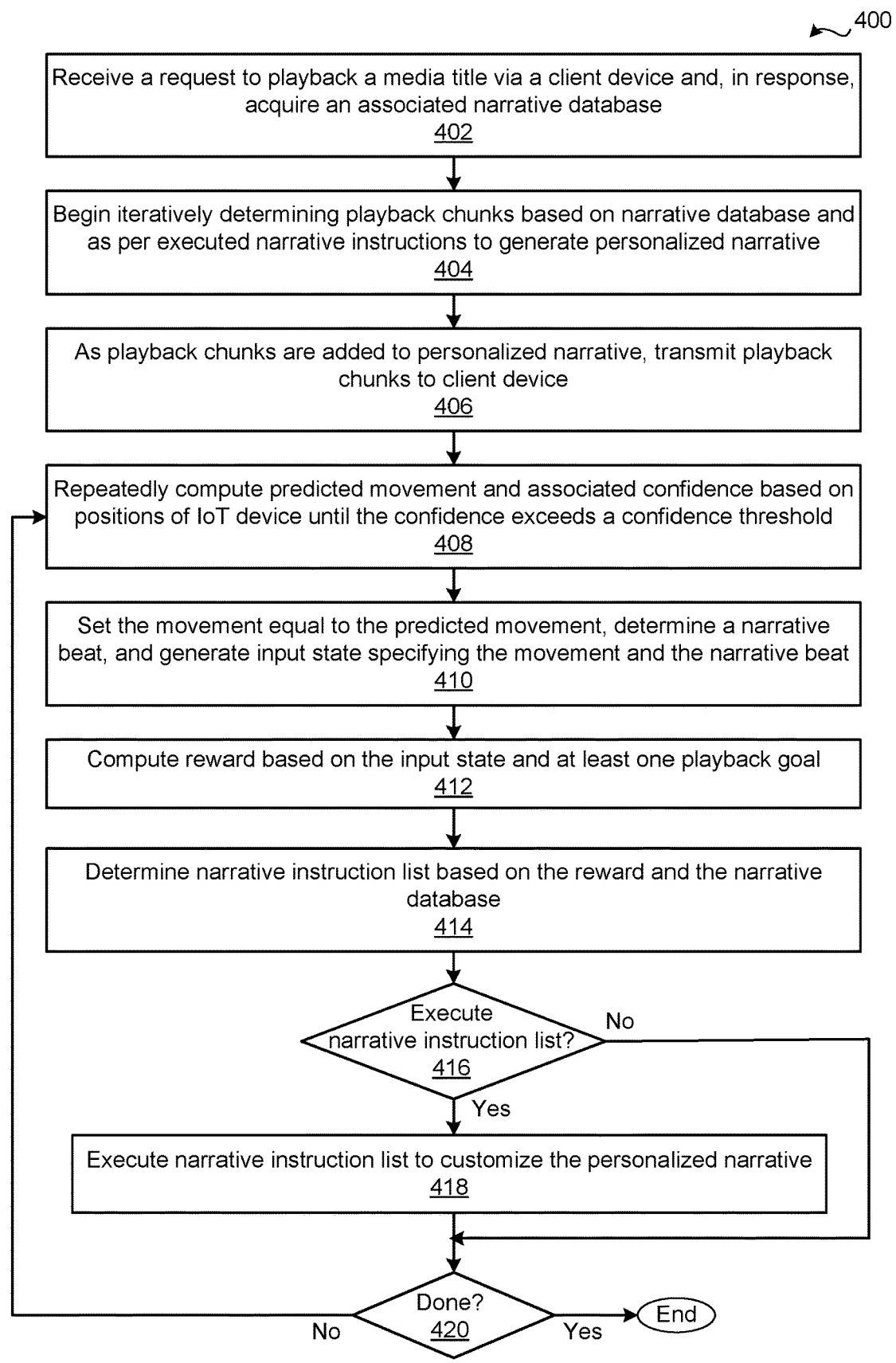
FIG. 4 is a flow diagram of method steps for playing back a media title based on user interactions with an IoT device, according to various embodiments.

FIG. 4 is a flow diagram of method steps for playing back a media title based on user interactions with an IoT device, according to various embodiments. Although the method steps are described with reference to the systems of FIGS. 1-3, persons skilled in the art will understand that any system configured to implement the method steps, in any order, falls within the scope of the present invention.

As shown, a method 400 begins a step 402, where the interactive streaming application 130 receives a request to playback the media title 128 via the client device 102 and, in response, acquires the narrative database 120. At step 404, the narrative agent 370 begins to iteratively determine the playback chunks 192 based on the narrative database 120 and any narrative instructions received from the reinforcement-learning model 360 to incrementally generate the personalized narrative 198. At step 406, as the narrative agent 370 adds each of the playback chunks 192 to the personalized narrative 198, and the interactive streaming application 130 transmits the playback chunks 192 to the client device 102.

At step 408, the movement recognition engine 140 repeatedly computes the predicted movement 250 and the confidence 252 based on the positions of the IoT device 106 until the confidence 252 exceeds the confidence threshold 260. At step 410, the movement recognition engine 140 sets the movement 152 equal to the predicted movement 250, determines the narrative beat 154 associated with the movement 152, and generates the input state 150 that includes, without limitation, the movement 152 and the narrative beat 154.

At step 412, the reward model 350 computes the reward 358 based on the input state 150 and at least one playback goal. At step 414, the reinforcement-learning model 360 determines the narrative instruction list 362 based on the reward 358 and the narrative database 120. At step 416, the reinforcement-learning model 360 determines whether to execute the narrative instruction list 362. If, at step 416, the reinforcement-learning model 360 determines not to execute the narrative instruction list 362, then the method 400 proceeds directly to step 420.

If, however, at step 416, the reinforcement-learning model 360 determines to execute the narrative instruction list 362, then the method 400 proceeds to step 418. At step 418, the reinforcement-learning model 360 and/or the narrative agent 370 execute the narrative instructions included in the narrative instruction list 362 to customize the personalized narrative 198.

At step 420, the interactive streaming application 130 determines whether to stop playing back the media title 128. If, at step 420, the interactive streaming application 130 determines not to stop playing back the media title 128, then the method 400 returns to step 408, where the interactive streaming application 130 continues to optimize the personalized narrative 198 based on the movements of the IoT device 106. If, however, at step 420, the interactive streaming application 130 determines to stop playing back the media title 128, then the method 400 terminates.

In sum, the disclosed techniques enable automatic, real-time personalization of narratives of media titles for individual users. In some embodiments, an interactive streaming application includes, without limitation, a narrative personalization engine and a movement recognition engine. In response to a request to playback a media title for a user, the narrative personalization engine initiates a real-time playback of the media title based on a narrative database associated with the media title. The narrative database includes, without limitation, any number of chunks, any number of branches, any amount and type of beat metadata associated with the chunks, and the media title. Each branch specifies a linear sequence of any number of the chunks. For each of the chunks, the beat metadata specifies, without limitation, a narrative label that characterizes at least one aspect of the chunk.

The narrative personalization engine includes, without limitation, a narrative agent, a reinforcement-learning model, and a reward model. In operation, the narrative agent iteratively determines a playback chunk from the chunks and appends the playback chunk to a personalized narrative. The narrative agent selects each playback chunk according to an overall playback strategy that can be overridden and/or modified via narrative instruction lists received from the reinforcement-learning model. The narrative agent continues to append playback chunks to the personalized narrative until the narrative agent appends a playback chunk that is associated with a narrative label indicating a final resolution, When the narrative agent appends a new playback chunk to the personalized narrative, the interactive streaming application transmits the playback chunk to a client device that subsequently displays the playback chunk to the user. As the client device displays the playback chunks, the user can physically move an IoT device. Based on the positions of the IoT device over time, the movement recognition engine uses a trained classifier to generate predicted movements and associated confidences. Whenever the trained classifier generates a predicted movement associated with a confidence that exceeds a confidence threshold, the movement recognition engine generates a new input state that includes, without limitation, a movement and a narrative beat. The movement recognition engine sets the movement equal to the predicted movement and sets the narrative beat equal to the narrative label associated with a playback chunk displayed during the movement. Subsequently, the interactive streaming application transmits the input state to the narrative personalization engine.

When the narrative personalization engine receives an input state, the reward model computes a reward based on the input state and at least one playback goal that correlates to the interest level of the user during the playback of the media title. The reinforcement-learning model computes a narrative instruction list based on the reward, the narrative database, and the personalized narrative thus-far. The narrative instruction list includes, without limitation, any number of narrative instructions that, when executed, can override and/or modify the overall playback strategy and/or modify the narrative database. If the reinforcement-learning model predicts that executing the narrative instruction list is likely to increase the reward by more than a change threshold, then the reinforcement-learning model and/or the narrative agent execute the narrative instruction list. In this fashion, the narrative personalization engine can adjust the playback of the media title based on the behavior of the user as expressed via the IoT device.

At least one technical advantage of the disclosed techniques relative to the prior art is that, with the disclosed techniques, a playback of a given media title can be personalized automatically for different users. More specifically, for each user, the interactive streaming application dynamically generates the personalized narrative that controls the playback of the media title based on interactions between the user and an IoT device. Consequently, the overall quality of the viewing experience for a given media title can be increased across a broad range of users. Further, because the interactive streaming application generates each personalized narrative based on a playback goal that correlates to user interest, the interactive streaming application also can increase the perceived quality of a media title in the minds of users. These technical advantages provide one or more technological improvements over prior art techniques.

1. In some embodiments, a computer-implemented method for playing back a media title comprises causing a client device to playback a first chunk of the media title, while the client device plays back the first chunk; determining a first movement of an internet of things ("IoT") device under control of a user; performing one or more reinforcement-learning operations based on the first chunk and the first movement to determine a second chunk of the media title to playback; and causing the client device to playback the second chunk of the media title.

2. The computer-implemented method of clause 1, wherein performing the one or more reinforcement-learning operations comprises computing a reward based on the first chunk and the first movement, inputting the reward into a reinforcement-learning model that maps the reward to a narrative instruction based on a policy, and executing the narrative instruction to determine the second chunk.

3. The computer-implemented method of clauses 1 or 2, wherein performing the one or more reinforcement-learning operations comprises mapping the first movement to the first chunk based on at least one timestamp, generating an input state that includes the first movement and beat metadata associated with the first chunk, mapping the input state to a narrative instruction, and executing the narrative instruction to determine the second chunk.

4. The computer-implemented method of any of clauses 1-3, wherein the beat metadata specifies at least one of a part of a narrative, a genre, or a chronological point in time associated with the media title.

5. The computer-implemented method of any of clauses 1-4, wherein determining the first movement comprises inputting a plurality of positions associated with the IoT device across a time interval into a trained classifier that, in response, outputs a classification of the first movement.

6. The computer-implemented method of any of clauses 1-5, wherein the trained classifier comprises at least one of a trained neural network, a trained decision tree, a trained random forest, or a trained support vector machine.

7. The computer-implemented method of any of clauses 1-6, wherein chunks of the media title are streamed to the client device in accordance with a personalized narrative, and causing the client device to playback the second chunk comprises appending the second chunk to the personalized narrative.

8. The computer-implemented method of any of clauses 1-7, wherein the first chunk is subsequent to the second chunk in a default linear playback order associated with a first branch of the media title.

9. The computer-implemented method of any of clauses 1-8, wherein the media title comprises a feature-length movie, a short film, an episode of a show, an audiovisual clip, a recording of a sports event, or a recording of a music event.

10. The computer-implemented method of any of clauses 1-9, wherein the IoT device comprises a toy.

11. In some embodiments, one or more non-transitory computer readable media include instructions that, when executed by one or more processors, cause the one or more processors to playback a media title by performing the steps of causing a client device to playback a first chunk of the media title, while the client device plays back the first chunk; determining a first movement of an internet of things ("IoT") device under control of a user; performing one or more reinforcement-learning operations based on the first chunk and the first movement to determine a second chunk of the media title to playback; and causing the client device to playback the second chunk of the media title.

12. The one or more non-transitory computer readable media of clause 11, wherein performing the one or more reinforcement-learning operations comprises computing a reward based on the first chunk and the first movement, inputting the reward into a reinforcement-learning model to generate a narrative instruction, and executing the narrative instruction to determine the second chunk.

13. The one or more non-transitory computer readable media of clauses 11 or 12, wherein performing the one or more reinforcement-learning operations comprises mapping the first movement to the first chunk based on at least one timestamp, generating an input state that includes the first movement and beat metadata associated with the first chunk, mapping the input state to a narrative instruction, and executing the narrative instruction to determine the second chunk.

14. The one or more non-transitory computer readable media of any of clauses 11-13, wherein the beat metadata specifies at least one of a part of a narrative, a genre, or a chronological point in time associated with the media title.

15. The one or more non-transitory computer readable media of any of clauses 11-14, wherein determining the first movement comprises inputting a plurality of positions associated with the IoT device across a time interval into a trained classifier that, in response, outputs a classification of the first movement.

16. The one or more non-transitory computer readable media of any of clauses 11-15, wherein determining the first movement comprises computing a first confidence based on a first buffer of positions associated with the IoT device, determining that the first confidence does not exceed a confidence threshold, adding a new position associated with the IoT device to the first buffer of positions to generate a second buffer of positions, and computing a classification of the first movement based on the second buffer of positions.

17. The one or more non-transitory computer readable media of any of clauses 11-16, wherein chunks of the media title are streamed to the client device in accordance with a personalized narrative, and causing the client device to playback the second chunk comprises appending the second chunk to the personalized narrative.

18. The one or more non-transitory computer readable media of any of clauses 11-17, wherein the first chunk is included in a first branch of the media title, and the second chunk is included in a second branch of the media title.

19. The one or more non-transitory computer readable media of any of clauses 11-18, wherein the IoT device comprises a toy.

20. In some embodiments, a system comprises one or more memories storing instructions and one or more processors coupled to the one or more memories that, when executing the instructions, perform the steps of causing a client device to playback a first chunk of a media title, while the client device plays back the first chunk; determining a first movement of an internet of things ("IoT") device under control of a user; performing one or more reinforcement-learning operations based on the first chunk and the first movement to determine a second chunk of the media title to playback; and causing the client device to playback the second chunk of the media title.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playing back a media title, the method comprising:
    causing a client device to playback a first chunk of the media title;
    while the client device plays back the first chunk, determining a first movement of an internet of things ("IoT") device under control of a user;
    performing one or more reinforcement-learning operations based on the first chunk and the first movement to determine a second chunk of the media title to playback; and
    causing the client device to playback the second chunk of the media title.

2. The computer-implemented method of claim 1, wherein performing the one or more reinforcement-learning operations comprises:
    computing a reward based on the first chunk and the first movement;
    inputting the reward into a reinforcement-learning model that maps the reward to a narrative instruction based on a policy; and
    executing the narrative instruction to determine the second chunk.

3. The computer-implemented method of claim 1, wherein performing the one or more reinforcement-learning operations comprises:
    mapping the first movement to the first chunk based on at least one timestamp;
    generating an input state that includes the first movement and beat metadata associated with the first chunk;
    mapping the input state to a narrative instruction; and
    executing the narrative instruction to determine the second chunk.

4. The computer-implemented method of claim 3, wherein the beat metadata specifies at least one of a part of a narrative, a genre, or a chronological point in time associated with the media title.

5. The computer-implemented method of claim 1, wherein determining the first movement comprises inputting a plurality of positions associated with the IoT device across a time interval into a trained classifier that, in response, outputs a classification of the first movement.

6. The computer-implemented method of claim 5, wherein the trained classifier comprises at least one of a trained neural network, a trained decision tree, a trained random forest, or a trained support vector machine.

7. The computer-implemented method of claim 1, wherein chunks of the media title are streamed to the client device in accordance with a personalized narrative, and causing the client device to playback the second chunk comprises appending the second chunk to the personalized narrative.

8. The computer-implemented method of claim 1, wherein the first chunk is subsequent to the second chunk in a default linear playback order associated with a first branch of the media title.

9. The computer-implemented method of claim 1, wherein the media title comprises a feature-length movie, a short film, an episode of a show, an audiovisual clip, a recording of a sports event, or a recording of a music event.

10. The computer-implemented method of claim 1, wherein the IoT device comprises a toy.

11. One or more non-transitory computer readable media including instructions that, when executed by one or more processors, cause the one or more processors to playback a media title by performing the steps of:
   causing a client device to playback a first chunk of the media title;
   while the client device plays back the first chunk, determining a first movement of an internet of things ("IoT") device under control of a user;
   performing one or more reinforcement-learning operations based on the first chunk and the first movement to determine a second chunk of the media title to playback; and
   causing the client device to playback the second chunk of the media title.

12. The one or more non-transitory computer readable media of claim 11, wherein performing the one or more reinforcement-learning operations comprises:
   computing a reward based on the first chunk and the first movement;
   inputting the reward into a reinforcement-learning model to generate a narrative instruction; and
   executing the narrative instruction to determine the second chunk.

13. The one or more non-transitory computer readable media of claim 11, wherein performing the one or more reinforcement-learning operations comprises:
   mapping the first movement to the first chunk based on at least one timestamp;
   generating an input state that includes the first movement and beat metadata associated with the first chunk;
   mapping the input state to a narrative instruction; and
   executing the narrative instruction to determine the second chunk.

14. The one or more non-transitory computer readable media of claim 13, wherein the beat metadata specifies at least one of a part of a narrative, a genre, or a chronological point in time associated with the media title.

15. The one or more non-transitory computer readable media of claim 11, wherein determining the first movement comprises inputting a plurality of positions associated with the IoT device across a time interval into a trained classifier that, in response, outputs a classification of the first movement.

16. The one or more non-transitory computer readable media of claim 11, wherein determining the first movement comprises:
   computing a first confidence based on a first buffer of positions associated with the IoT device;
   determining that the first confidence does not exceed a confidence threshold;
   adding a new position associated with the IoT device to the first buffer of positions to generate a second buffer of positions; and
   computing a classification of the first movement based on the second buffer of positions.

17. The one or more non-transitory computer readable media of claim 11, wherein chunks of the media title are streamed to the client device in accordance with a personalized narrative, and causing the client device to playback the second chunk comprises appending the second chunk to the personalized narrative.

18. The one or more non-transitory computer readable media of claim 11, wherein the first chunk is included in a first branch of the media title, and the second chunk is included in a second branch of the media title.

19. The one or more non-transitory computer readable media of claim 11, wherein the IoT device comprises a toy.

20. A system comprising:
   one or more memories storing instructions; and
   one or more processors coupled to the one or more memories that, when executing the instructions, perform the steps of:
      causing a client device to playback a first chunk of a media title;
      while the client device plays back the first chunk, determining a first movement of an internet of things ("IoT") device under control of a user;
      performing one or more reinforcement-learning operations based on the first chunk and the first movement to determine a second chunk of the media title to playback; and
      causing the client device to playback the second chunk of the media title.

* * * * *